US012631149B2

(12) United States Patent
Ravikanti et al.

(10) Patent No.: US 12,631,149 B2
(45) Date of Patent: May 19, 2026

(54) AIRCRAFT COMPRISING A GAS TURBINE ENGINE HAVING PRIMARY AND SECONDARY FUEL-INJECTORS

(71) Applicant: ROLLS-ROYCE plc, London (GB)

(72) Inventors: Murthy V V S Ravikanti, Derby (GB); John E Rimmer, Derby (GB); Thomas A Chin, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 19/038,249

(22) Filed: Jan. 27, 2025

(65) Prior Publication Data

US 2025/0264063 A1     Aug. 21, 2025

(30) Foreign Application Priority Data

Feb. 19, 2024    (GB) ...................................... 2402325

(51) Int. Cl.
*F02C 9/46*       (2006.01)
*F02C 7/22*       (2006.01)
(Continued)

(52) U.S. Cl.
CPC .................. *F02C 9/46* (2013.01); *F02C 7/22* (2013.01); *F02C 7/228* (2013.01); *F02C 7/262* (2013.01);
(Continued)

(58) Field of Classification Search
CPC .... F02C 9/28; F02C 9/263; F02C 9/40; F02C 9/46; F02C 7/22; F02C 7/228; F02C 7/262; F23R 3/346; F23R 3/36; F05D 2270/09
See application file for complete search history.

(56) References Cited

U.S. PATENT DOCUMENTS 4,761,948 A  *  8/1988  Sood .......................... F23R 3/36
                                                          60/39.463
5,036,657 A  *  8/1991  Seto ......................... F02C 7/222
                                                          60/746
(Continued)

FOREIGN PATENT DOCUMENTS

WO        2023/188984 A1    10/2023

OTHER PUBLICATIONS

Jun. 16, 2025 Extended European Search Report issued in European Patent Application No. 25152799.0.
(Continued)

*Primary Examiner* — William H Rodriguez
(74) *Attorney, Agent, or Firm* — Oliff PLC

(57) ABSTRACT

An aircraft includes an engine system which includes a gas turbine engine and a fuel system. The engine has combustion apparatus having an annular array of alternating primary and secondary fuel-injectors. The fuel system includes a fuel store and a controller. The controller is arranged to receive one or more signals indicative of one or more of (i) starting of the gas turbine engine; (ii) flame-out of the combustion apparatus; and (ii) a manoeuvring of the aircraft associated with a risk of flame-out of the combustion apparatus or preparation for such manoeuvring; and in response thereto to control the fuel system to commence supply of fuel from the fuel store to the secondary fuel-injectors of the combustion apparatus. Compared to known aircraft, engine lighting and relighting are achieved for more rapidly and reliably and the aircraft is less susceptible to flame-out, especially where hydrogen fuel is used.

7 Claims, 2 Drawing Sheets

(51) Int. Cl.

| | |
|---|---|
| *F02C 7/228* | (2006.01) |
| *F02C 7/262* | (2006.01) |
| *F02C 9/26* | (2006.01) |
| *F02C 9/28* | (2006.01) |
| *F02C 9/40* | (2006.01) |
| *F23R 3/34* | (2006.01) |
| *F23R 3/36* | (2006.01) |
| *F23R 3/28* | (2006.01) |

(52) U.S. Cl.
CPC ............... *F02C 9/263* (2013.01); *F02C 9/28* (2013.01); *F02C 9/40* (2013.01); *F23R 3/346* (2013.01); *F23R 3/36* (2013.01); *F05D 2270/09* (2013.01); *F23R 3/28* (2013.01)

(56) References Cited

U.S. PATENT DOCUMENTS

| | | | | |
|---|---|---|---|---|
| 5,211,005 | A * | 5/1993 | Hovnanian | F02C 7/222 60/800 |
| 5,321,949 | A | 6/1994 | Napoli et al. | |
| 5,345,757 | A * | 9/1994 | MacLean | F02C 9/28 60/742 |
| 5,755,090 | A * | 5/1998 | Hu | F23D 23/00 60/746 |
| 5,862,668 | A * | 1/1999 | Richardson | F23R 3/50 60/737 |
| 6,968,699 | B2 * | 11/2005 | Howell | F23R 3/343 60/776 |
| 7,506,511 | B2 * | 3/2009 | Zupanc | F23R 3/343 60/746 |
| 8,122,725 | B2 * | 2/2012 | Myers | F02C 7/228 60/776 |
| 9,587,833 | B2 * | 3/2017 | Lee | F23R 3/26 |
| 9,631,560 | B2 * | 4/2017 | Hoke | F02C 7/22 |
| 9,874,351 | B2 * | 1/2018 | Wolfe | F02C 7/228 |
| 11,181,274 | B2 * | 11/2021 | Danis | F02C 7/222 |
| 11,988,158 | B2 * | 5/2024 | Meshkin Fam | F02C 7/262 |
| 12,467,403 | B1 * | 11/2025 | Durocher | F02C 3/22 |
| 2004/0124282 | A1 * | 7/2004 | Mansour | F23D 11/383 239/548 |
| 2006/0156729 | A1 | 7/2006 | Sprouse et al. | |
| 2007/0039329 | A1 * | 2/2007 | Abreu | F02C 7/228 60/776 |
| 2008/0173019 | A1 | 7/2008 | Kobayashi et al. | |
| 2010/0162709 | A1 | 7/2010 | Morgan | |
| 2013/0219911 | A1 | 8/2013 | Dudebout et al. | |
| 2013/0340438 | A1 * | 12/2013 | Abreu | F23R 3/28 60/772 |
| 2016/0033133 | A1 | 2/2016 | Johnson et al. | |
| 2016/0305667 | A1 * | 10/2016 | Wolfe | F02C 7/224 |
| 2017/0003032 | A1 * | 1/2017 | Jorgensen | F23R 3/14 |
| 2017/0138268 | A1 * | 5/2017 | Nakahara | F23D 17/00 |
| 2021/0095599 | A1 * | 4/2021 | Asai | F23R 3/346 |
| 2021/0180518 | A1 | 6/2021 | Koganezawa et al. | |
| 2023/0015930 | A1 * | 1/2023 | Meshkin Fam | B64D 37/30 |
| 2024/0210039 | A1 * | 6/2024 | Madden | F23K 5/08 |
| 2024/0263783 | A1 * | 8/2024 | Hu | F02C 7/22 |

OTHER PUBLICATIONS

Sep. 6, 2024 combined Search and Examination Report issued in British Patent Application No. 2402326.9.

U.S. Appl. No. 19/038,212, filed Jan. 27, 2025 in the name of Chin, T. et al.

Sep. 18, 2024 combined Search and Examination Report issued in British Patent Application No. 2402325.1.

Mar. 5, 2026 Notice of Allowance issued in U.S. Appl. No. 19/038,212.

* cited by examiner

AIRCRAFT COMPRISING A GAS TURBINE ENGINE HAVING PRIMARY AND SECONDARY FUEL-INJECTORS

TECHNICAL FIELD

The invention relates to aircraft comprising gas turbine engines.

BACKGROUND

Flameout-out of a gas turbine engine may have one of several possible causes, for example fuel starvation or compressor stall or, specifically in the case of an aero engine, excessive altitude, severe precipitation or foreign object damage. In the case of an aero engine, flame-out is more likely during certain aircraft manoeuvres, and efficient and reliable re-lighting is of key importance. However, lighting and relighting can be difficult and unreliable, especially for certain types of fuel, such as gaseous hydrogen. For aero engines in particular, resistance to flame-out and the ability to rapidly light, and re-light after a flame-out incident, are important objectives in the design of gas turbine engine systems.

BRIEF SUMMARY

A first aspect of the invention provides an aircraft comprising an engine system which includes:

(i) a gas turbine engine including combustion apparatus having an annular array of alternating primary and secondary fuel-injectors each having a respective fuel-emitting face; and (ii) a fuel system comprising a fuel store and a controller;

wherein (a) the fuel system is arranged to provide fuel from the fuel store to the primary and secondary fuel-injectors;

(b) each primary and secondary fuel-injector is arranged to emit fuel in a direction having a component normal to the plane of the array; and (c) the controller is arranged to receive one or more signals indicative of one or more of (i) starting of the gas turbine engine;

(ii) flame-out of the combustion apparatus; and (ii) a manoeuvring of the aircraft associated with a risk of flame-out of the combustion apparatus or preparation for such manoeuvring;

and in response thereto to control the fuel system to commence supply of fuel from the fuel store to the secondary fuel-injectors of the combustion apparatus. The fuel store may comprise a first fuel tank containing a first fuel and a second fuel tank containing a second fuel, the fuel system being arranged to provide the first fuel to the primary fuel-injectors and the second fuel to the secondary fuel-injectors. Each primary fuel-injector may be arranged to emit fuel in a direction having a component in the plane of the array directed towards the fuel-emitting face of an adjacent secondary fuel-injector, each such component having the same sense with respect to the array. Each primary fuel-injector may be arranged to emit fuel in first and second directions each having a respective component in the plane of the array directed towards the fuel-emitting face of a respective adjacent secondary fuel-injector. Each secondary fuel-injector may be arranged to emit fuel in a direction having a component in the plane of the array directed towards the fuel-emitting face of an adjacent primary fuel-injector, each such component having the same sense with respect to the array. Each secondary fuel-injector may be arranged to emit fuel in first and second directions each having a respective component in the plane of the array directed towards the fuel-emitting face of a respective adjacent primary fuel-injector.

A second aspect of the invention provides an engine system comprising (i) a gas turbine engine including combustion apparatus having an annular array of alternating primary and secondary fuel-injectors each having a respective fuel-emitting face; and (ii) a fuel system comprising a first fuel tank containing a first fuel and a second tank containing a second fuel, and a controller;

wherein (a) the fuel system is arranged to provide the first fuel from the first fuel tank to the primary fuel-injectors and the second fuel from the second fuel tank to the secondary fuel-injectors;

(b) each primary and secondary fuel-injector is arranged to emit fuel in a direction having a component normal to the plane of the array; and (c) the controller is arranged to control respective proportions of a total fuel flow rate or a total chemical energy flow rate to the combustion apparatus which are provided to the primary fuel-injectors and the secondary fuel-injectors. Each primary fuel-injector may be arranged to emit fuel in a direction having a component in the plane of the array directed towards the fuel-emitting face of an adjacent secondary fuel-injector, each such component having the same sense with respect to the array. Each primary fuel-injector may be arranged to emit fuel in first and second directions each having a respective component in the plane of the array directed towards the fuel-emitting face of a respective adjacent secondary fuel-injector. Each secondary fuel-injector may be arranged to emit fuel in a direction having a component in the plane of the array directed towards the fuel-emitting face of an adjacent primary fuel-injector, each such component having the same sense with respect to the array. Each secondary fuel-injector may be arranged to emit fuel in first and second directions each having a respective component in the plane of the array directed towards the fuel-emitting face of a respective adjacent primary fuel-injector.

A third aspect of the invention provides an aircraft comprising an engine system according to the second aspect.

A fourth aspect of the invention provides a method of operating combustion apparatus which comprises an annular array of alternating primary and secondary fuel-injectors, each primary and secondary fuel-injector being arranged to emit fuel in a direction having a component normal to the plane of the array and the combustion apparatus being comprised in a gas turbine engine of an aircraft, the method comprising the steps of (i) providing fuel to the primary fuel-injectors;

(ii) detecting one or more of (a) starting of the gas turbine engine;

(b) flame-out of the combustion apparatus; and (c) manoeuvring of the aircraft associated with a risk of flame-out of the combustion apparatus, or preparation for such manoeuvring; and (iii) in response to such detection, commencing supply of fuel from the fuel store to the secondary fuel-injectors of the combustion apparatus.

A fifth aspect of the invention provides a method of operating combustion apparatus which comprises an annular array of alternating primary and secondary fuel-injectors, each primary and secondary fuel-injector being arranged to emit fuel in a direction having a component normal to the plane of the array and the combustion apparatus being comprised in a gas turbine engine of an aircraft, the method comprising the steps of (i) providing first and second fuels to the primary and secondary fuel-injectors respectively; and (ii) controlling respective proportions of the total fuel flow rate, or total chemical energy flow rate, provided to the combustion apparatus which are provided to the primary and secondary fuel-injectors.

Step (ii) may be carried out to maximise the range of the aircraft or to mitigate climate forcing produced by products of fuel combustion and/or contrails of the aircraft.

BRIEF DESCRIPTION OF THE DRAWINGS

Embodiments of the invention are described below by way of example only and with reference to the accompanying drawings in which.

DETAILED DESCRIPTION

Figures 1, 2:
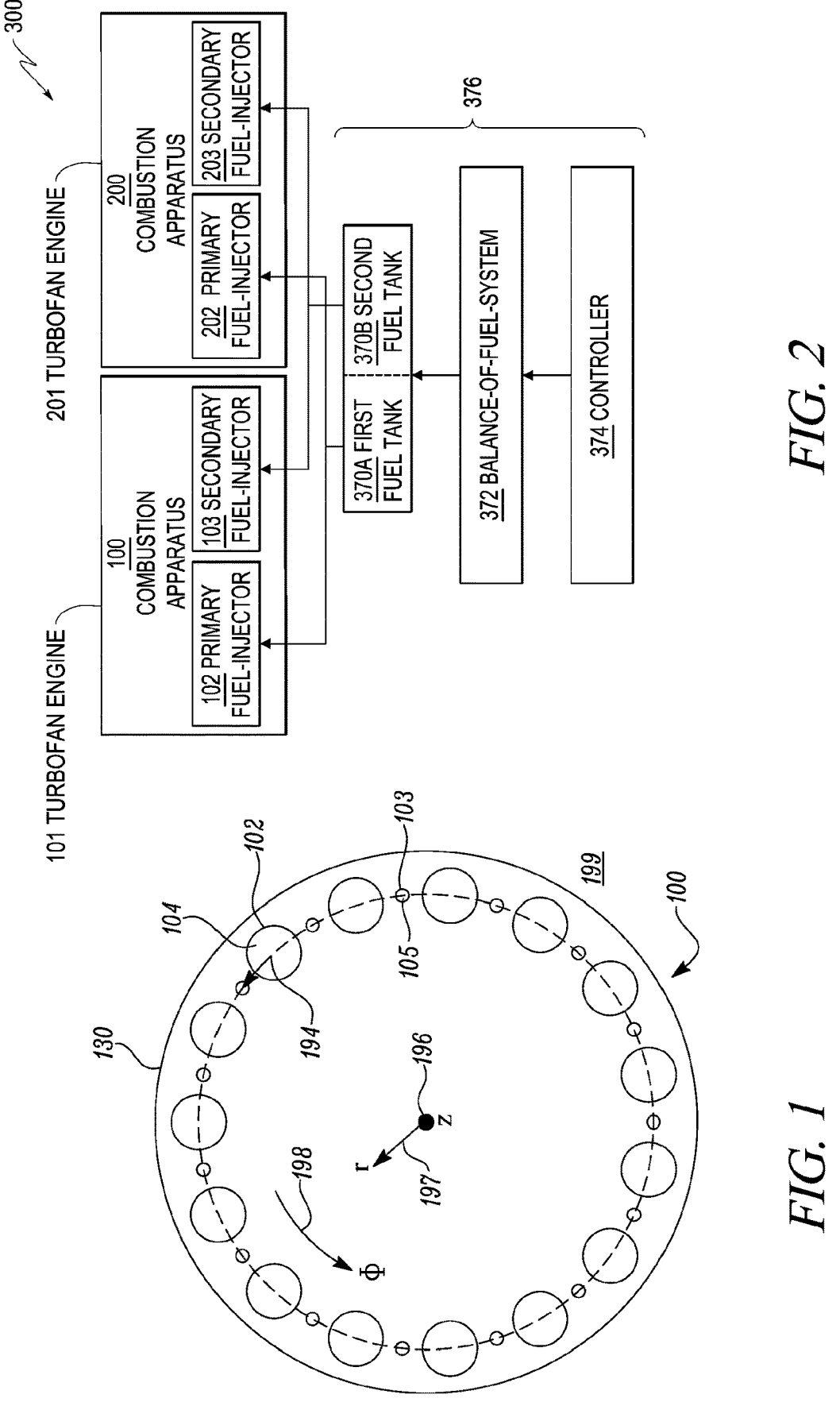
FIG. 1 shows combustion apparatus.
FIG. 2 shows an engine system of the invention comprising a turbofan engine having the combustion apparatus of FIG. 1.

FIG. 1 shows combustion apparatus 100 having an alternating annular array of 15 like primary fuel-injectors 102 and 15 like secondary fuel-injectors 103 arranged within and towards one end of a cylindrical outer casing 130. The cylindrical outer casing 130 has a central longitudinal axis 196 defining an axial direction with unit vector z (out of the plane of FIG. 1). The axis 196 also defines radial and azimuthal directions having unit vectors r 197, $\phi$ 198. Each primary fuel-injector 102 has a fuel-emitting face 104. Each secondary fuel-injector 103 has a fuel-emitting face 105. The fuel-emitting face 104 of each primary fuel injector comprises a set of primary fuel-emitting apertures (not shown). The fuel-emitting face 105 of each secondary fuel-injector 103 comprises a set of secondary fuel-emitting apertures (not shown).

In operation of the combustion apparatus 100 fuel is emitted from each of the primary fuel-injectors 102 in a direction having a component in the z direction, i.e. normal to the plane 199 of the annular array of fuel-injectors. The direction in which fuel is emitted from any given primary fuel-injector may additionally have a component in the $\phi$ (or $-\phi$) and/or $-r$ directions. For example, 194 indicates a component in the $\phi$ direction, the component being in the plane 199 of the annular array and directed towards the fuel-emitting face of an adjacent secondary fuel-injector. In a variant of the combustion apparatus 100, a given primary fuel-injector 102 may emit fuel in first and second directions having components in the $\phi$ and $-\phi$ directions respectively.

Each of the secondary fuel-injectors 103 may emit fuel in a direction having a component in the z direction. The direction in which fuel is emitted from a given secondary fuel-injector may additionally have a component in the $\phi$ (or $-\phi$) and/or $-r$ directions. For example, fuel may be emitted from a given secondary fuel-injector in a direction having a component in the plane 199 of the array of fuel-injectors directed towards the fuel-emitting face of an adjacent primary fuel-injector. In a variant of the combustion apparatus 100, a given secondary fuel-injector 102 may emit fuel in first and second directions having components in the $\phi$ and $-\phi$ directions respectively.

Figure 3:
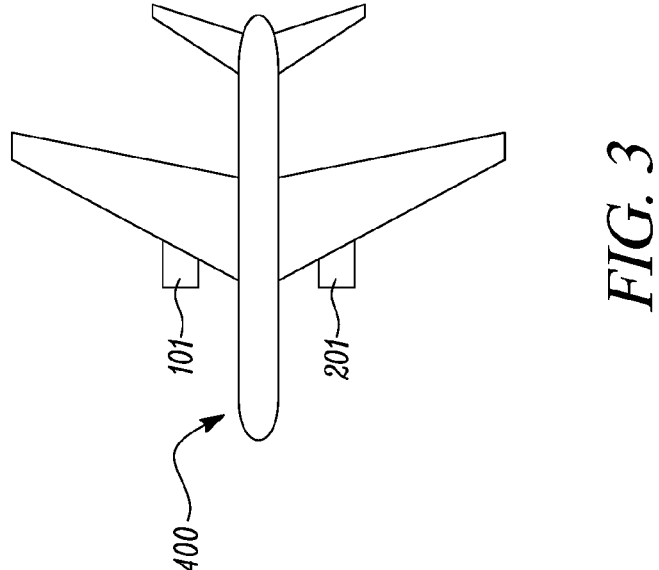
FIG. 3 shows an aircraft of the invention comprising the engine system of FIG. 2.

Referring to FIGS. 2 and 3, an aircraft 400 of the invention comprises an engine system 300 of the invention, the engine system 300 comprising first and second like turbofan engines 101, 201. The first turbofan engine 101 has combustion apparatus 100, like to the apparatus 100 of FIG. 1, and includes a set 102 of primary fuel-injectors and a set 103 of secondary fuel-injectors. Similarly, the second turbofan engine 201 has combustion apparatus 200, like to the apparatus 100 of FIG. 1, and includes a set 202 of primary fuel-injectors and a set 203 of secondary fuel injectors. The engine system 300 further comprises a fuel store having first and second fuel tanks 370A, 370B arranged to provide fuel to the sets 102, 202 of primary fuel-injectors and the set 103, 203 of secondary fuel-injectors respectively. If the fuel stored within the fuel tanks 370A, 370B is the same type of fuel, then the individual tanks 370A, 370B may be replaced by a fuel store having only a single fuel tank. The fuel tanks 370A, 370B are comprised in a fuel system 376 which further includes a controller 374 and a balance-of-fuel-system 372 which includes fuel pumps and other equipment necessary to deliver fuel from the fuel tanks 370A, 370B to the combustion apparatus 100, 200.

The controller 374 is arranged to receive a signal corresponding to a thrust demanded of the engine system 300 and to control the total fuel flow (or total chemical energy flow) provided to the combustion apparatus 100, 200 such that the demanded thrust is provided to the aircraft 400. During normal operation of the aircraft 400, for example during cruising at altitude, fuel is provided only to the primary fuel-injectors 102, 202.

The controller 374 is further arranged to receive one or more signals from one or more sensors (not shown) of the aircraft 400 indicative of one or more of (i) flame-out of either or both turbofan engines 101, 201;

(ii) manoeuvring of the aircraft 400 associated with a risk of flame-out of the combustion apparatus 100, 200, or preparation for such manoeuvring; and (iii) starting of one or both of the turbofan engines 101, 201;

and in response provide a control signal to the balance-of fuel-system 372 such that fuel is provided to one or both sets 103, 203 of secondary fuel-injectors, as necessary, in addition to fuel being provided to the primary sets 102, 202 of fuel-injectors, in order to provide lighting or re-lighting of one or both engines 101, 201, or to prevent flame-out in one or both engines 101, 201.

Due to operation of one or both sets 103, 203 of secondary fuel-injectors, the speed and reliability of lighting and re-lighting of one or both combustion apparatus 100, 200 is increased compared to combustion apparatus of the prior art, and the resistance of the combustion apparatus 100, 200 to flame-out is improved compared to combustion apparatus of the prior art, especially in a case where hydrogen fuel is supplied to one or both turbofan engines 101, 201. Lighting, re-lighting and flame-out resistance are particularly improved where fuel is emitted from each of the primary fuel-injectors in a direction having a component in the plane 199 of the annular array of fuel-injectors in the $\pm\phi$ direction directed towards the fuel-emitting face of an adjacent secondary fuel-injector, in addition to a component in the z direction. Similarly, lighting, re-lighting and flame-out resistance are particularly improved where fuel is emitted from each of the secondary fuel-injectors in a direction having a component in the plane 199 of the annular array of fuel-injectors in the ±φ direction directed towards the fuel-emitting face of an adjacent primary fuel-injector, in addition to a component in the z direction.

Lighting, re-lighting and flame-out resistance are particularly improved with respect to combustion apparatus of the prior art when using hydrogen fuel, since in combustion apparatus of the prior art hydrogen has negligible bulk swirl and there is little or no transport of fuel between adjacent azimuthal sections of a combustor of the prior art.

Once lighting or re-lighting of one or both combustion apparatus 100, 200 has been achieved, or once a manoeuvre of the aircraft 400 associated with a risk of flame-out has been completed, the controller 374 is arranged to provide a control signal to the balance-of-fuel-system 372 so that the fuel supply to the secondary fuel-injectors 103, 203 of one or both combustion apparatus 100, 200 is terminated.

According to another example, the aircraft 400 is a so-called "dual-fuel" aircraft and the fuel tanks 370A, 370B each store a respective type of fuel. A first fuel is stored in the first fuel tank 370A and provided to the sets 102, 202 of primary fuel-injectors of both combustion apparatus 100, 200. A second fuel is stored in the second fuel tank 370B and provided to the sets 103, 203 of secondary fuel-injectors of both combustion apparatus 100, 200. In general, during operation of the aircraft 400, fuel is provided to both the primary 102, 202 and secondary 103, 203 fuel-injectors of the combustion apparatus 100, 200 from the first 370A and second 370B fuel tanks respectively.

According to operational and flight requirements for maximising aircraft range, or meeting other flight mission objectives, the controller 374 is arranged to control the proportion x of the total fuel flow (or total chemical energy flow) to the combustion apparatus 100, 200 which is provided to the sets 102, 202 of primary fuel-injectors in the range 0≤x≤1, with arbitrary precision, and the corresponding proportion 1−x which is provided to the sets 103, 203 of secondary fuel-injectors.

SUMMARY OF REFERENCE NUMERALS
USED IN THE ACCOMPANYING DRAWINGS

100, 200 combustion apparatus
101, 201 turbofan engines
102, 202 primary fuel-injector(s)
103, 203 secondary fuel-injector(s)
104 fuel-emitting face of primary fuel-injector
105 fuel-emitting face of secondary fuel-injector
130 combustor casing
194 component of direction of fuel emission from primary fuel-injector
196 central longitudinal axis of combustor casing; unit vector in z direction
197, 198 unit vectors in r, φ directions
199 plane of annular arrays of primary and secondary fuel-injectors
300 engine system
370A, 370B first and second fuel tanks
372 balance-of-fuel-system
374 controller
376 fuel system
400 aircraft

The invention claimed is:
1. An aircraft comprising an engine system which includes:

(i) a gas turbine engine including combustion apparatus having a cylindrical outer casing and an annular array of alternating primary and secondary fuel-injectors arranged on a circumference of the cylindrical outer casing, each of the primary and secondary fuel-injectors having a respective fuel-emitting face; and (ii) a fuel system comprising a fuel store and a controller; wherein (a) the fuel system is arranged to provide a fuel from the fuel store to the primary and secondary fuel-injectors, the fuel is hydrogen fuel;

(b) each primary and secondary fuel-injector is arranged to emit the fuel in a direction having a component that is parallel to a longitudinal axis of the cylindrical outer casing and is normal to a plane of the array; and (c) the controller is arranged:
   to determine whether one or more signals received, the one or more signals indicative of one or more of
   (i) starting of the gas turbine engine;
   (ii) flame-out of the combustion apparatus; and
   (iii) a manoeuvring of the aircraft associated with a risk of flame-out of the combustion apparatus or preparation for such manoeuvring;
   in response to determining that the one or more signals is received to control the fuel system to commence supply of the fuel from the fuel store to the secondary fuel-injectors of the combustion apparatus, and
   in response to determining that the one or more signals is absent, to control the fuel system to not supply the fuel from the fuel store to the secondary fuel-injectors of the combustion apparatus.

2. The aircraft according to claim 1, wherein each primary fuel-injector is arranged to emit the fuel in a direction having a component in the plane of the array directed towards the fuel-emitting face of an adjacent secondary fuel-injector, each such component having the same sense with respect to the array.

3. The aircraft according to claim 2, wherein each primary fuel-injector is arranged to emit the fuel in first and second directions each having a respective component in the plane of the array directed towards the fuel-emitting face of a respective adjacent secondary fuel-injector.

4. The aircraft according to claim 1, wherein each secondary fuel-injector is arranged to emit the fuel in a direction having a component in the plane of the array directed towards the fuel-emitting face of an adjacent primary fuel-injector, each such component having the same sense with respect to the array.

5. The aircraft according to claim 4, wherein each secondary fuel-injector is arranged to emit the fuel in first and second directions each having a respective component in the plane of the array directed towards the fuel-emitting face of a respective adjacent primary fuel-injector.

6. The aircraft according to claim 1, wherein each primary fuel-injector is arranged to emit the fuel in a single direction, said single direction having a component in the plane of the array directed towards the fuel-emitting face of an adjacent secondary fuel-injector, each such component having the same sense with respect to the array.

7. A method of operating combustion apparatus which comprises a cylindrical outer casing and an annular array of alternating primary and secondary fuel-injectors arranged on a circumference of the cylindrical outer casing, each primary and secondary fuel-injector being arranged to emit hydrogen fuel in a direction having a component that is parallel to a longitudinal axis of the cylindrical outer casing and is normal to a plane of the array, and the combustion apparatus being comprised in a gas turbine engine of an aircraft, the method comprising the steps of (i) providing the hydrogen fuel to the primary fuel-injectors;

(ii) determining whether one or more signals is received the one or more signals indicative of one or more of (a) starting of the gas turbine engine;

(b) flame-out of the combustion apparatus; and (c) manoeuvring of the aircraft associated with a risk of flame-out of the combustion apparatus, or preparation for such manoeuvring; and (iii) in response to determining that the one or more signals is received, commencing supply of the hydrogen fuel from a fuel store to the secondary fuel-injectors of the combustion apparatus, and (iv) in response to determining that the one or more signals is absent, controlling the fuel store to not supply the hydrogen fuel to the secondary fuel-injectors of the combustion apparatus.

* * * * *